United States Patent
He et al.

(10) Patent No.: US 7,702,620 B2
(45) Date of Patent: Apr. 20, 2010

(54) SYSTEM AND METHOD FOR RANKED KEYWORD SEARCH ON GRAPHS

(75) Inventors: Hao He, Durham, NC (US); Philip S. Yu, Chappaqua, NY (US); Haixun Wang, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/693,471

(22) Filed: Mar. 29, 2007

(65) Prior Publication Data

US 2008/0243811 A1   Oct. 2, 2008

(51) Int. Cl.
G06F 17/30   (2006.01)
(52) U.S. Cl. .................................... 707/3; 707/6; 707/7
(58) Field of Classification Search .................. 707/1–7
See application file for complete search history.

(56) References Cited

U.S. PATENT DOCUMENTS

| | | | | |
|---|---|---|---|---|
| 5,852,822 | A * | 12/1998 | Srinivasan et al. | 707/4 |
| 6,691,108 | B2 * | 2/2004 | Li | 707/3 |
| 7,305,402 | B2 * | 12/2007 | Hind et al. | 707/101 |
| 2002/0099700 | A1 * | 7/2002 | Li | 707/5 |
| 2005/0278325 | A1 * | 12/2005 | Mihalcea et al. | 707/6 |
| 2006/0004715 | A1 * | 1/2006 | Lock et al. | 707/3 |
| 2007/0073734 | A1 * | 3/2007 | Doan et al. | 707/100 |
| 2007/0192306 | A1 * | 8/2007 | Papakonstantinou et al. | 707/5 |
| 2007/0250477 | A1 * | 10/2007 | Bailly | 707/2 |
| 2008/0140655 | A1 * | 6/2008 | Hoos et al. | 707/6 |

OTHER PUBLICATIONS

XRank: Ranked Keyword search over XML Documents, Guo et al., ACM 2003, pp. 1-12.*
G. Bhalotia, C. Nakhe, A. Hulgeri, S. Chakrabarti, and S. Sudarshan, Keyword Searching and Browsing in Databases using Banks, In Proceedings in 18th International Conference on Data Engineering, 2002.
V. Kacholia, S. Pandit, S. Chakrabarti, S. Sudarshan, R. Desai, and H. Karambelkar, Bidirectional Expansion for Keyword Search on Graph Databases, In Proceedings of the 31st VLBD Conference, Norway, 2005.
G. Karypis and V. Kumar, Analysis of Multilevel Graph Partitioning, In Supercomputing, 1995.
Joseph Liu, A Graph Partitioning Algorithm by Node Separators, ACM Transactions on Mathematical Software, vol. 15, No. 3, Sep. 1986, pp. 198-219.

* cited by examiner

*Primary Examiner*—Debbie M Le
(74) *Attorney, Agent, or Firm*—Ference & Associates LLC

(57) ABSTRACT

Arrangements and methods for providing for the efficient implementation of ranked keyword searches on graph-structured data. Since it is difficult to directly build indexes for general schemaless graphs, conventional techniques highly rely on graph traversal in running time. The previous lack of more knowledge about graphs also resulted in great difficulties in applying pruning techniques. To address these problems, there is introduced herein a new scoring function while the block is used as an intermediate access level; the result is an opportunity to create sophisticated indexes for keyword search. Also proposed herein is a cost-balanced expansion algorithm to conduct a backward search, which provides a good theoretical guarantee in terms of the search cost.

16 Claims, 3 Drawing Sheets

Example of a query and answers.

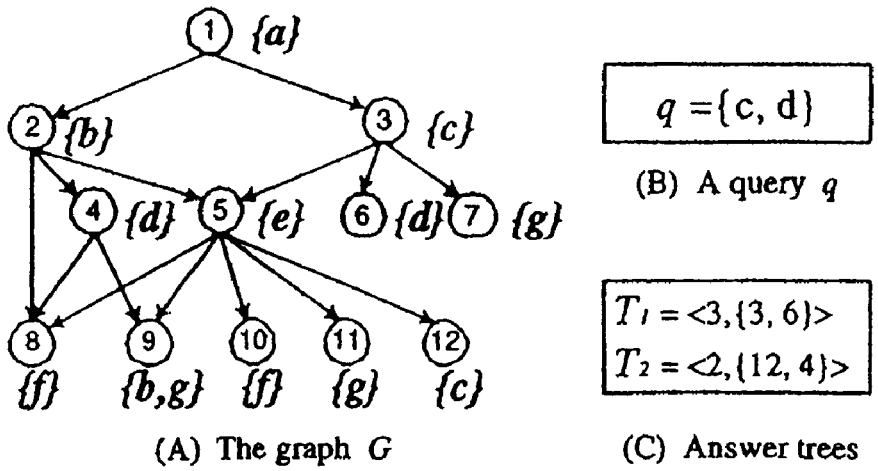
Figure 1: Example of a query and answers.
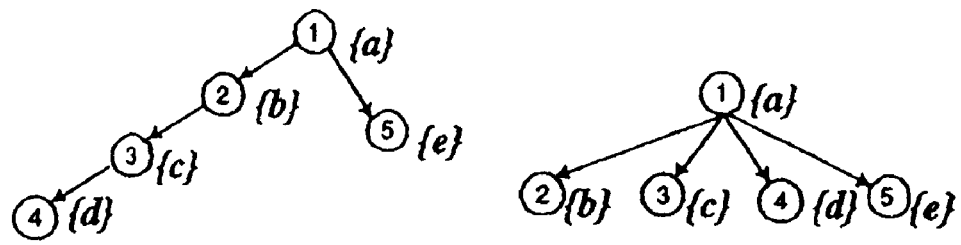
Figure 2: Answers with different tree shapes.

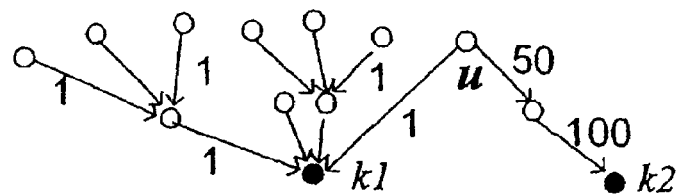
Figure 3: A bad case for distance-balanced expansion.
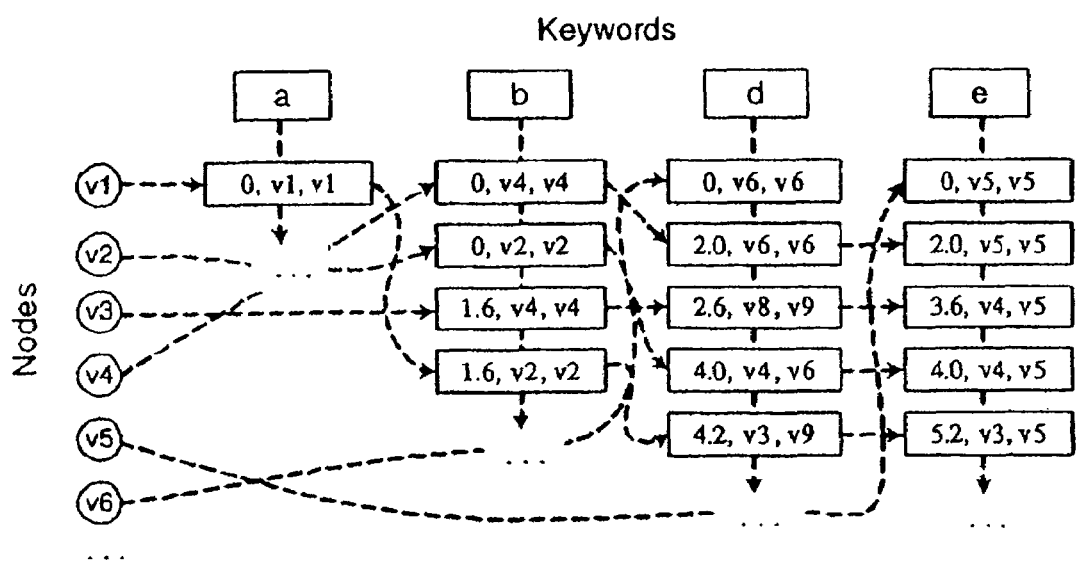
Figure 4: The node-keyword index of $b_1$.

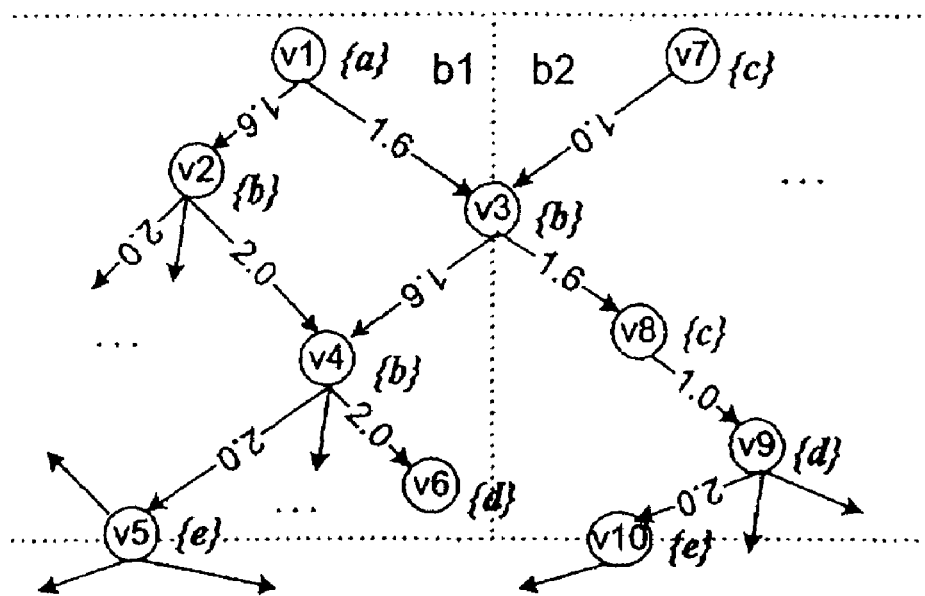
Figure 5: Example of blocks.
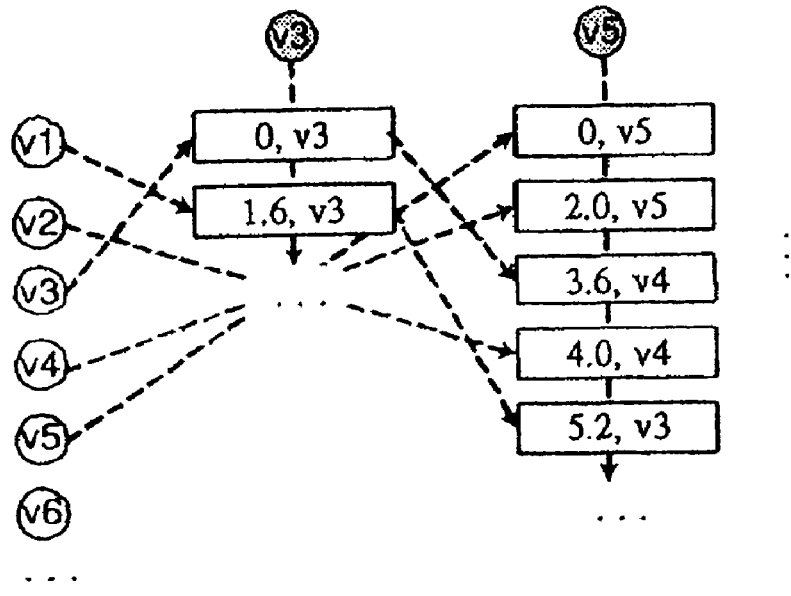
Figure 6: The node-portal index of $b_1$.

SYSTEM AND METHOD FOR RANKED KEYWORD SEARCH ON GRAPHS

FIELD OF THE INVENTION

The present invention generally relates to query processing over graph-structured data, and to systems and arrangements for performing the same.

BACKGROUND OF THE INVENTION

Herebelow, numerals contained in brackets—[ ]—are keyed to the list of references found towards the end of the present disclosure.

Historically, keyword searches over tree- and graph-structured data has attracted much attention. Generally, such a simple, user-friendly query interface does not require users to master a complex query language or understand the underlying data schema. Further, many graph-structured data have no clear, well-structured schema, so many existing query languages are not applicable. All in all, the implementation of efficient ranked keyword searches, especially on node-labeled graphs, has been elusive.

Ranked keyword searches on schemaless graph-structured data pose many unique technical challenges. First, techniques developed for XML, which take advantage of the hierarchical property of trees, no longer apply. Second, lack of any schema precludes many optimization opportunities at compile-time and makes efficient runtime search much more critical.

In light of the above, conventional efforts suffer from several drawbacks. The first observation is that existing keyword search algorithms on general graphs do not take full advantage of indexing. Their only use of indexes is for identifying the set of nodes containing keywords; finding substructures connecting these nodes relies solely on graph traversal. For a system that is supposed to support a large workload of keyword queries, it seems natural to exploit indexes that provide graph connectivity information to speed up searches. Lack of this feature can be attributed in part to the difficulty in indexing connectivity for general graphs, because a naive index would have an unacceptably high (quadratic) storage requirement.

Another observation is that existing algorithms employ heuristic graph search strategies that lack strong performance guarantees and may lead to poor performance on certain graphs.

In view of the foregoing, a need has been recognized in connection with improving upon the shortcomings and difficulties of conventional efforts.

SUMMARY OF THE INVENTION

To overcome the difficulties discussed above, there are broadly contemplated herein, in accordance with at least one presently preferred embodiment of the present invention, arrangements and methods for providing for the efficient implementation of ranked keyword searches on graph-structured data. More particularly, there is introduced herein a new scoring function with a block being used as an intermediate access level. Sophisticated indexes for keyword search can thusly be created.

Also broadly contemplated herein is a cost-balanced expansion algorithm to conduct a backward search, which provides a good theoretical guarantee in terms of the search cost.

In summary, one aspect of the invention provides a method comprising: initiating a keyword search on graph-structured data; employing a keyword search strategy via visiting nodes to produce at least one answer for the keyword search; the employing step further comprising: partitioning the data graph into blocks, each block comprising at least one node; and storing information in accordance with a multi-level index, the multi-level index comprising levels each storing information to guide searching in accordance with at least one aspect of at least one block.

Another aspect of the invention provides an apparatus comprising: a search initiator which initiates a keyword search on graph-structured data; an answer producer which employs a keyword search strategy via visiting nodes to produce at least one answer for the keyword search; the answer producer further acting to: partition the data graph into blocks, each block comprising at least one node; and store information in accordance with a multi-level index, the multi-level index comprising levels each storing information to guide searching in accordance with at least one aspect of at least one block.

Furthermore, an additional aspect of the invention provides a program storage device readable by machine, tangibly embodying a program of instructions executable by the machine to perform a method comprising the steps of: initiating a keyword search on graph-structured data; employing a keyword search strategy via visiting nodes to produce at least one answer for the keyword search; the employing step further comprising: partitioning the data graph into blocks, each block comprising at least one node; and storing information in accordance with a multi-level index, the multi-level index comprising levels each storing information to guide searching in accordance with at least one aspect of at least one block.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates an example of a query with answers

FIG. 2 schematically illustrates answers with different tree shapes.

FIG. 3 schematically illustrates a bad case for distance-based expansion.

FIG. 4 schematically illustrates a node-keyword index.

FIG. 5 schematically illustrates an example of blocks.

FIG. 6 schematically illustrates a node-portal index.

DESCRIPTION OF THE PREFERRED EMBODIMENTS

Broadly contemplated herein, in accordance with at least one presently preferred embodiment of the present invention, is an indexing and query processing scheme for a ranked keyword search over directed graphs. This scheme may be termed "BLINKS" (for Bi-Level INdexing for Keyword Search).

Generally, on a high level (and ignoring for now the use of indexes in search), BLINKS is based on cost-balanced expansion, a novel backward search strategy whose cost is within a factor of m (the number of query keywords) of an optimal "oracle" backward search strategy that "magically" knows how to visit the minimum number of nodes in order to produce the top-k answers. This new strategy alleviates many known problems of the original backward search strategy pioneered by Bhalotia et al. [1].

BLINKS further augments this new search strategy by using a bi-level index structure, which captures shortest-path information between nodes and keywords. This index provides additional pruning power and acceleration for the search. Specifically, the index allows quick forward jumps from a node to a keyword, effectively making the search bidirectional. Bidirectional search is first proposed in [3]. They rely on a heuristic prioritization strategy to explore the graph a node at a time; in contrast, guided by the connectivity information in the bi-level index, BLINKS is able to make longer and more directed forward jumps towards target keywords; BLINKS, essentially, exploits indexing extensively in pruning and accelerating keyword searches on general graphs.

Broadly contemplated herein, further, is a naive realization of the index that keeps all node-keyword distances that would be too large to store and too expensive to maintain for large graphs. Instead, BLINKS partitions a data graph into multiple subgraphs, or blocks: The bi-level index stores summary information at the block level to guide search across blocks, and more detailed information for each block to accelerate forward searches from nodes within the block. This bi-level design allows effective trade-off between space and search efficiency through control of the blocking factor.

BLINKS supports sophisticated, realistic scoring functions based on both structure (e.g., node scores reflecting PageRank and edge scores reflecting connection strengths) and content (e.g., IR-style scores for nodes matching keywords).

Turning now to a more detailed discussion of embodiments of the present invention, and by way of establishing the particulars of problems at hand, similarly to [1, 3], there is a concern here with querying a directed graph G=(V,E), where each node v∈V is labeled with keywords. For example, in the graph shown in FIG. 1(A), node 9 contains two keywords {b,g}. A query q includes a set of query keywords {$k_1, \ldots, k_m$}, and an answer to q as follows:

Definition 1. Given a directed graph G and a query q={$k_1, \ldots, k_m$}, an answer to q is a pair ⟨r, { ..., n} ⟩, where r and $n_i$'s are nodes (not necessarily distinct) in G satisfying: (i) For every i, node $n_i$ contains keyword $k_i$; (ii) For every i, there exists a directed path in G from r to $n_i$.

Here, r is the root of the answer and $n_i$'s are the matches of the answer. Specific for directed graphs, an answer must be a subtree where r reaches all keywords. For graph G and query q={c,d}, two answers $T_1$ and $T_2$ are found as shown in FIG. 1(C).

As is known, answer goodness can be measured by a scoring function, which maps an answer to a numeric score; the higher the score, the better the answer. In accordance with a preferred embodiment of the present invention, a scoring function can enhance search efficiency for both indexing and query processing.

Generally, the score of an answer T=⟨r, {$n_1, \ldots, n_m$}⟩ to query {$k_1, \ldots, k_m$} is defined as the inverse of the weighted sum of two components: $S(T)=(\alpha \overline{S}_p(T)+\beta \overline{S}_n(T))^{-1}$, where $\alpha$ and $\beta$ are tunable weighting parameters. Given the inverse, $\overline{S}_p$ and $\overline{S}_n$ are actually "anti-scores"; i.e., the lower they are, the better the answer. The reason for using anti-scores will become apparent shortly. Different anti-scores are defined as follows:

Path anti-score $\overline{S}_p(T)=\Sigma_{1\leq i\leq m} d(r, n_i)$, where d $(r,n_i)$ is the shortest graph distance from r to $n_i$, defined as the sum of edge weights on the shortest directed path (in terms of total edge weight) from r to $n_i$.

Node anti-score $\overline{S}_n(T)$ is defined as $\Sigma_{1\leq i\leq m}\overline{S}_n(n_i)+\overline{S}_n(r)$, where $\overline{S}_n(n)$ is the anti-score of a node n, which can be flexibly defined only if a lower anti-score means higher relevancy/importance.

$\overline{S}_p(T)$ measures the tightness of connections between r and the matches. Intuitively, a source node with a small fan-out means strong connections to its sinks, which is usually captured by a small edge weight (distance). Accordingly, there is preferably assigned weight log(1+out_degree(u)) to edge (u,v) in BLINKS.

The path anti-score is distributive over matches. Therefore, a common edge shared by paths to two different matches will have its weight counted twice in $\overline{S}_p(T)$. This provides a contrast to other systems such as in [1], where such edges are counted only once. In semantics, an approach in accordance with at least one embodiment of the present invention can distinguish the two answer trees shown in FIG. 2, where the answer on the right is favored with an intent to emphasize the relationship between the root and the matches.

By way of another significant advantage enjoyed herein, it is usually the case that in conventional systems, finding top ranked answers by summing edge weights (instead of paths as in BLINKS) is equivalent to the group Steiner tree problem, which is NP-hard and thus much harder to evaluate. In contrast, an approach in accordance with at least one embodiment of the present invention makes score computation more amenable to indexing and simplifies graph search strategy.

The weighted sum of anti-scores are distributive additive over the nodes and edges contributing to an answer. When searching a graph for query answers, one can preferably incrementally maintain a "partial" anti-score for a current search state before reaching an actual answer, by simply adding contributions from the newly visited graph components. Furthermore, since anti-scores are non-negative, this partial anti-score conveniently serves as a lower bound for the anti-score (and hence an upper bound for the final score) of the answer yet to be discovered. This property enables effective pruning.

The semantics of a top-k query will now be addressed, beginning with the definition presented below.

Definition 2. Given a query and a scoring function S, the (best) score of a node r is the maximum S(T) over all answers T rooted at r (or 0 if there are no such answers). We call an answer rooted at r with the best score a best answer rooted at r. A top-k query returns the k nodes in the graph with the highest best scores, together with these scores and a best answer for each node returned.

It can be noted here that the k best answers are essentially forced to have distinct roots. This semantics guards against the case where a "hub" node pointing to many nodes containing query keywords can potentially become the root for a huge number (exponential in the number of nodes containing the same keyword) of answers. These answers may overlap with each other and each carries very little additional information from the rest. More importantly, requiring distinct answer roots enables indexing such that for a node, only the shortest distance to a keyword needs to be stored. Besides, given an answer root, users can always choose to further examine other answers rooted at the node.

The discussion now turns to a search strategy of BLINKS on a high level and its comparison, qualitatively, with conventional algorithms. To simplify the presentation, one may consider only the path anti-score so that, given weight assignments for edges, the problem now reduces to that of finding k nodes, where each node can reach all query keywords and the sum of its distances to these keywords is as small as possible.

One known search algorithm is the backward search algorithm. In the present problem, in the absence of any index that can provide graph connectivity information beyond a single hop, one can answer the query by exploring the graph starting from the keyword nodes (containing at least one query keyword). This approach leads to a backward search algorithm [1], which works as follows:

Let $E_i$ denote the set of nodes that are known that during the search can reach query keyword $k_i$; $E_i$ is called the cluster for $k_i$.

Initially, $E_i$ starts out as the set of nodes $O_i$ that directly contain $k_i$; this initial set is the cluster origin.

In each search step, one chooses an incoming edge to one of previously visited nodes (say v), and then follow that edge backward to visit its source node (say u); any $E_i$ containing v now expands to include u as well. Once a node is visited, all its incoming edges become known to the search and available for choice by a future step.

One has discovered an answer root x if, for each cluster $E_i$, either $x \in E_i$ or x has an edge to some node in $E_i$.

The algorithm in [1] uses the following two strategies for choosing what to visit next. For convenience, one can define the distance from a node n to a set of nodes N as the shortest distance from n to any node in N.

Equi-distance expansion in each cluster: Intuitively, the backward search algorithm expands a cluster by visiting nodes in order of increasing distance from its origin. Formally, the node u to visit next (following edge u→v backward) is the node with the shortest distance (among all nodes not in $E_i$) to $O_i$, where $E_i$ is a cluster containing v.

Distance-balanced expansion across clusters: The algorithm tries to balance the distance between each clusters origin to its frontier across all clusters.

A rigorous investigation of the optimality of the two strategies noted above may now be offered. First, the optimality of equi-distance expansion within each cluster ma be established via Theorem 1 below. (A proof of Theorem 1 and other theorems appears in the Appendix.)

Theorem 1. An optimal backward search algorithm must follow the equi-distance expansion in each cluster.

On the other hand, the second strategy employed in [1] and noted above may lead to poor performance on certain graphs. FIG. 3 shows one such example. Suppose that $\{k_1\}$ and $\{k_2\}$ are two origins. Many nodes can reach $k_1$ with short paths, but only one edge into $k_2$ with a large weight (100). With distance-balanced expansion, one would not expand the $k_2$ cluster until all nodes within distance 100 to $k_1$ have been visited. It would have been unnecessary to visit many nodes had the algorithm chosen to expand the $k_2$ cluster earlier.

By way of another conventional approach, Kacholia et al. [3] proposed a bidirectional search algorithm to address the problem just described, in that one has the option of exploring the graph by following forward edges as well. The rationale is that, for example, in FIG. 3, if the algorithm is allowed to explore forward from node u towards k2, one can identify u as an answer root much faster. To control the expansion order, Kacholia et al. prioritize nodes by heuristic activation factors, which intuitively estimate how likely nodes can be answer roots. While this strategy is shown to perform well in multiple scenarios, it is difficult to provide any worst-case performance guarantee. The reason is that activation factors are heuristic measures derived from graph topology and only the visited part of the graph, so they may not accurately reflect the likelihood of reaching keyword nodes through an unexplored region of the graph within a reasonable distance.

Now in contrast to the backward and bidirectional approaches just described, an approach in accordance with at least one embodiment of the present invention can be based on two central ideas. First, a new, cost-balanced strategy can be employed for controlling expansion across clusters, with a provable bound on its worst-case performance. Second, one can preferably use indexing to support forward jumps in a search. Indexing permits determining whether a node can reach a keyword and what the shortest distance is, thereby eliminating the uncertainty and inefficiency of step-by-step forward expansion as in [3]. Cost based expansion will first be described along with a proof of its optimality, followed by a discussion of indexing.

Intuitively, an algorithm in accordance with at least one embodiment of the present invention attempts to balance the number of accessed nodes (i.e., the search cost) for expanding each cluster. Formally, the cluster $E_i$ to expand next is the cluster with the smallest cardinality.

The optimality of an algorithm A combining equi-distance and cost-balanced expansion strategies can now be explored (i.e., once one chooses the smallest cluster to expand, one can then choose the node with the shortest distance to this cluster's origin). Consider an optimal "oracle" backward search algorithm P; it must also provide equi-distance expansion within each cluster (Theorem 1). However, in addition, one can assume that P "magically" knows the right amount of expansion for each cluster such that the total number of nodes visited by P is minimized. Obviously, P is better than any practical algorithm. Although A does not have the advantage of P, it is shown by way of Theorem 2 that A is m-optimal, where m is the number of query keywords. Since most queries in practice contain very few keywords, A usually adds only a constant-factor overhead cost to the optimal algorithm.

Theorem 2. The number of nodes accessed by A is no more than m times the number of nodes accessed by P, where m is the number of query keywords.

By way of indexing, in order to facilitate efficient ranked keyword search on graphs, there are preferably indexed two types of information: (1) mapping from query keywords to nodes containing them; (2) shortest-paths from nodes to keywords. The latter type is especially difficult to index because of the inherent complexity of the problem on general graphs. A naive realization of the index that simply keeps distances for all node-keyword pairs would be too large to store and too expensive to maintain. Therefore, BLINKS preferably partitions a data graph into multiple subgraphs, or blocks; the bi-level index preferably stores summary information on the block level in a block index to guide search across blocks, as well as more detailed information in an intra-block index for each block to accelerate searches from nodes within the block.

To create the bi-level index, the graph is preferably first partitioned into blocks. A block index and intra-block index are then preferably built for each block. It should be noted, to start, that blocking can complicate searching across blocks, but this can be addressed by indexing through portals.

Searching for answers completely contained within a block is relatively easy given the intra-block index. However, an answer may span multiple blocks. The question is the following: given a partial answer found in a block, what information can help one complete the answer by visiting other blocks? It is noted that the nodes on the block boundary play an important role in this process.

Definition 3. A node is called a portal node (or portal) if its neighboring nodes are in different blocks. For a block, a portal can be either "in-portal" or "out-portal" or both. An in-portal has at least one incoming edge from another block and at least one outgoing edge in this block, while an out-portal has at least one outgoing edge to another block and at least one incoming edge from this block.

The above definition can be illustrated by an example in FIG. 5. As shown, the dotted line represents the boundary of blocks (graphs are assumed to be partitioned using nodes as separators). Node $v_3$ is a portal node, and appears in the intra-block index of both $b_1$ and $b_2$. Furthermore, $v_3$ is both in-portal and out-portal for both blocks—the expansion can go both ways. For block $b_1$, $v_5$ is an out-portal, that is, through $v_5$, one can forward the search from block $b_1$ to other blocks.

Answers that occupy multiple blocks will cross portal nodes on the block boundary. In the intra-block index, one also preferably stores distances from nodes to portals, which helps the search algorithm to shortcut traversals.

The discussion now turns to an intra-block index (IB-index) that, in accordance with at least one presently preferred embodiment of the present invention, indexes in-formation inside a block. The IB-index includes two similar data structures, the node-keyword index and the node-portal index. The node-keyword index precomputes distances paths between nodes and keywords, while the node-portal index between nodes and portals.

Two very basic operations to support a top-k query are: i) for a given keyword, find the set of nodes that can reach this keyword and the distance in between; and ii) for a given node, find the keywords that the node can reach and the distance in between. The node-keyword index precomputes such information in a block to speed up query processing.

Preferably, a data structure of "two-dimensional" linked lists can be used. As the first dimension, a linked list is created for each node x in the block. As the second dimension, a linked list is created for each keyword k that appears in the block. An entry, which records the distance between x and k in addition to other information, is preferably cross linked by the linked lists of x and k. This results in a mesh-like configuration, which allows the above operations to be carried out efficiently.

FIG. 4 illustrates the 2-d linked lists: the head of a horizontal list is a node ($v_1$, . . . , $v_6$) and the head of a vertical list is a keyword (a, b, d, or e).

Each entry, which is in the form of [dist, v, sink], respectively appears once in a horizontal list (say node x) and a vertical list (say keyword k). It means that in this block the shortest distance from x to keyword k, which belongs to node sink, is dist, v is the first node after x in the path. Entries in the vertical list are sorted by dist for efficient access. As an example, in FIG. 4, since node $v_5$ contains keyword e, so the linked lists of $v_5$ and e contain entry [0, $v_5$, $v_5$], and given the shortest path from $v_1$ to e is $v_1 \rightarrow v_2 \rightarrow v_3 \rightarrow v_4 \rightarrow v_5$ with length 5.2, the entry [5.2, $v_3$, $v_5$] appears in the linked lists of $v_1$ and e.

The node-keyword index preferably has properties as will now be discussed.

While each entry in the node-keyword index represents the shortest path in this block between a node x and a keyword k, it may not be the global shortest distance. For instance, in FIG. 5, node $v_1$ can reach keyword d at node $v_6$ in block $b_1$ with distance 5.2. However, $v_1$ can also reach d at node $v_9$ with a shorter distance 4.2, where $v_9$ belongs to $b_2$. Although the index may store a suboptimal path (due to block constraint), our search algorithm guarantees the global shortest path can always be found due to the algorithms expansion order. Details of the searching algorithm are discussed further below.

Entries in a vertical list are preferably sorted in increasing order of dist; this can be critical for improving search performance. Given a query q={$k_1$, . . . , $k_m$}, one preferably scans the linked lists for each $k_i$ in parallel. Because entries are sorted by dist, one will preferably access the entry with the smallest dist among all linked lists. Once the distance is already greater than the current anti-score bound, the scan is aborted it is concluded that this block cannot provide an answer whose anti-score is within the bound.

Finally, the node-keyword index is of size $O(n_b k_b)$, where $n_b$ is the block size (the number of nodes), and $k_b$ is the number of keywords in the block. With the assumption $k_b=O(n_b)$, the index size comes to $O(n^2_b)$. In practice, the number of entries is likely to be much smaller than $n_b^2$, as not every node and every keyword are connected.

The node-portal index is similar to the node-keyword index, except that it stores information between nodes and out-portals, instead of keywords. Since an answer may cross block boundaries through out-portals, one can preferably use this index for shortcutting graph traversal and for estimating answer scores. The node-portal index also preferably includes 2-d linked lists, as shown in FIG. 6. Here, a vertical list is headed by an out-portal (grayed circle), and it contains nodes that can reach this portal. Each entry includes two values: [dist, v] (as an out-portal itself is a node, the entry has no sink element as in the node-keyword index).

The IB-index for a block can be created by an algorithm similar to the backward expanding search algorithm given by [1], except that here one would be creating an index for all keywords in the block instead of answering queries at runtime. Intuitively, one can concurrently run $n_b$ copies of Dijkstra's [1] single source shortest path algorithm, one for each of the $n_b$ nodes in the block.

When the graph is updated, the IB-index is preferably maintained. In general, adding or deleting an edge has a global impact on the shortest distances between nodes. A great number of nodes may be involved just due to a single update and all distances of involved nodes should be updated, which also makes storing distances of all pairs infeasible. In accordance with an embodiment of the present invention (in BLINKS), one preferably only stores the information within a block. That is, index maintenance caused by an edge update is localized into the IB-index of the block that the edge belongs to, alleviating the index maintenance cost significantly.

The block index, for its part, is preferably a simple data structure. For each keyword, one preferably records the set of blocks that have at least one node which contains this keyword. For example in FIG. 5, let $L_{KB}(a)$ denote the list for keyword a. If block $b_2$ does not contain a, one has $L_{KB}(a)=\{b_1\}$. Keyword d appears in both blocks, so $L_{KB}(d)=\{b_1, b_2\}$.

Assume the original graph has n nodes and each block has $n_b$ nodes on average, and contains $k_b$ keywords on average. Then, each block will appear in $k_b$ linked lists. The space requirement for the block index is thus $$O\left(\frac{n}{n_b} k_b\right).$$

Given the assumption $k_b=O(n_b)$, the space requirement for the block index comes to $O(n)$. Since the space requirement for each IB-index is $O(n_b^2)$ Thus, the overall space requirement is $$O\left(n + \frac{n}{n_b} \cdot n_b^2\right) = O(nn_b).$$

The discussion now turns to a description of a top-k keyword search algorithm that leverages the bi-level indices in cost-balanced expansion to achieve good query performance.

Essentially, conventional keyword search methods explore graphs node-by-node in looking for answer trees. To speed up the process, BLINKS preferably partitions the search space into blocks, and conducts search on the block level as well as on the node level. More specifically, given a query consisting of a set of keywords, BLINKS preferably finds blocks that are relevant to the query via the block index, and backward-expands them in a block-by-block manner to cover more keywords in the query. During the expansion, BLINKS evaluates pre-computed keyword to node/portal distances maintained by the IB-index for each block to continuously refine the top-k answers to the query.

By way of some key concepts and data structures related to the search algorithm:

$q=\{k_1, k_2, \ldots, k_m\}$: a user query that includes m keywords.

$Q_{k_i}$: priority queue for keyword $k_i$. Each $Q_{k_i}$ is initialized with blocks that contain $k_i$ using information in the block index. Later, during backward expansion, other blocks will be added into $Q_{k_i}$ as well.

$|E_{k_i}|$: number of nodes that have been explored for keyword $k_i$.

$t_u$: Each node explored can potentially be a root node in an answer; one preferably stores the answer, which includes its distance to each keyword $k_i$. It also contains some other info (see below in the table).

$dist_{b,i}$: the shortest possible distance from unaccessed nodes in block b to keyword $k_i$. If a node is accessed, then it has exact distance (which can be larger or smaller than $dist_{b,i}$).

$score_k$: the score of the last k-th answer tree in the top-k list.

Preferably, on a coarse level, keyword search is conducted by block-based backward expansion. At each step of backward expansion, one must preferably first decide i) which keyword to expand next, and then, ii) if one has chosen keyword $k_i$, which block in $Q_{k_i}$ to expand next. These decisions are based on considerations now to be described.

First keyword selection is guided by the cost-balancing strategy. In other words, one should expand a keyword $k_i$ that best balances the number of nodes explored by different keywords ($|E_{k_i}|$). Note that, on the block level, one cannot achieve the exact balance, because nodes in a block are accessed in batch. In order to know $|\Delta E_{k_i}|$, that is, the number of nodes that will be accessed during the expansion of $k_i$ in the next block, one needs statistics on the node level. In our approach, we approximate the balance by minimizing the maximal cost difference between two keywords ($\max(|E_{k_i}|-|E_{k_j}|)$). We then estimate $|\Delta E_{k_i}|$ using the synopses of the IB-index. As will be explained soon, we scan the node-keyword (or node-portal) indices to expand the search in a block, thus the sum of the list lengths of the involved indices is a good estimation of $|\Delta E_{k_i}|$.

Next, after one has chosen keyword $k_i$, one should decide which block in $Q_{k_i}$ to expand. Blocks are prioritized by two criteria. i) Blocks with smaller lower bound distances to keyword $k_i$ have higher priority, because expanding such blocks guarantees the equi-distance strategy within a cluster. ii) For blocks with the same lower bound distance to $k_i$, priority is given to blocks that contain more keywords in q. Initially, all blocks in $Q_{k_i}$ contain $k_i$, which means their lower bound distances to $k_i$ are all 0, so they are prioritized by the second criterion.

After choosing a block b for a keyword $k_i$, information within the block is accessed (see block-access algorithm further below). Then, the block is backward expanded: its neighboring blocks that have an edge to the incoming portals of b become the new frontier. These blocks are inserted into priority queues. To decide their position in the queue, one preferably estimates their lower bound distances via their shared portals with block b, whose distances to the keywords have been calculated while we access block b.

| Block-based Search Algorithm |
|---|
| SEARCH(q) |
|   1: create a priority queue $Q_i$ for each keyword $k_i \in q$ |
|   2: add blocks containing $k_i$ into $Q_i$ |
|   3: while there exist non-empty queues do |
|   4:     determine $Q_i$ s.t. to expand $k_i$ best balances the cost |
|   5:     pick the head block b in $Q_i$ |
|   6:     remove b from all queues |
|   7:     ACCESSBLOCK(b) |
|   8:     {backward block-expansion} |
|   9:     for each incoming-neighboring block b' of b do |
| 10:         evaluate the distance lower bound ($dist_{b',i}$) from b' to $k_i$ for all keywords |
| 11:         if $dist_{b',i}$ is updated due to accessing b then |
| 12:            store the affected out-portals of b' {needed during accessing b' in future} |
| 13:            insert b' into the right position of $Q_i$ |

The algorithm set forth below accesses information inside a block. Conceptually, it performs backward expansion on the node level, but with LB-index, the expansion is much more efficient. This is so because distances from nodes to keywords and outportals are already available in the IB-index. Thus, instead of exploring the graph node by node, one can either find out the distances instantly or one can "jump" directly to the portals (block boundary).

For each node u accesses, it is associated with an array $t_u$, which records a potential answer rooted at u. For each keyword $k_i$ in query q, $t_u[i]$ indicates how u reaches $k_i$. The information includes the distance to $k_i$, the target node, and a status flag, which indicates if the shortest distance is acquired. Each access to u causes some entries of $t_u$ updated, which corresponds to the growing partial answer rooted at u. Once all $t_u[i]$'s have determined the shortest distances, $t_u$ records a complete answer. If the new answers score $score(t_u)$ is in top-k, current top-k answers need to be updated. Note that using a scoring function as contemplated herein, a partial answer can be pruned early once its score has been smaller than the current score of the k-th answer.

ACCESSBLOCK(b) is invoked in two cases. In the first case, b contains some keywords of q and b has not been accessed in the query. The expansion starts from origins (nodes that contain keywords of q) in b. Distances are retrieved from the node-keyword index $L_{NK}$ and information for potential answer trees is updated. When a new node is encountered during scanning of the indices, for example u in $L_{NK}(k_i)$, u may be a new potential answer root. There is then created $t_u$, while $t_u[i]$ is updated with $dist_{u,k_i}$. Then t there is a check to see if other entries of $t_u$ can be filled by other $L_{NK}$ lists. Note that $L_{NK}$ stores only local shortest distances, and the global shortest distances are found by the search algorithm.

In the second case, ACCESSBLOCK(b) is invoked by previous exploration on b's outgoing-neighboring blocks. That is, backward expansion is initiated from out-portals of b. So one need only scan the node-portal index $L_{NP}$ for some stored out-portals that have been affected by other blocks' explorations.

Similar to the bidirectional search, this algorithm takes advantage of both backward and forward search. Besides the backward expansion in block-level mentioned above, the backward search is also embodied in accessing the IB-index for a keyword or a portal (i.e., scanning $L_{NK}$ or $L_{NP}$ vertically). On the other hand, when the IB-index is accessed for a node (i.e., scanning $L_{NK}$ or $L_{NP}$ horizontally), it is the forward search.

So far, as discussed hereinabove, a search algorithm in accordance with at least one presently preferred embodiment of the present invention has focused on finding answers with the lowest path anti-scores. It will now be apparent that one can incorporate the node anti-scores into the algorithm. When starting the search from a cluster origin $O_i$, there can be initialized the current node-to-keyword distance at node $$v \in O_i \text{ to } \frac{\beta}{\alpha}\overline{S}_n(v),$$

where $\overline{S}n$ is computed with respect to $k_j$, and $\beta/\alpha$ accounts for the weighting parameters discussed hereinabove. The anti-score of root can also be added in a similar way. The pruning logic still works correctly.

---

Algorithm 5.2 Access a block

ACCESSBLOCK(b)

1: {Case I: keyword nodes in b}
2: if b is accessed for the first time and contains keywords then
3:     scan the index $L_{NK}$ ($k_i$) for existing $k_j$'s in parallel
4:     while there is any unaccessed node in indexes do
5:         get the next node u and create $t_u$ {to store the potential answer rooted at u}
6:         update $t_u$'s entries for $k_j$'s by checking $L_{NK}$ (u)
7:         CHECKSCORE($t_u$)
8: {Case II: keyword nodes come from other blocks}
9: scan $L_{NP}$ (p) in parallel, where the out-portal p is affected by previous block access
10: while there is any unchecked node in $L_{NP}$ (p) do
11:     get the next node u from appropriate $L_{NP}$ (p)
12:     if u has been marked as not-top-k then
13:         continue
14:     for each $k_i$ that causes p updated do
15:         evaluate the undetermined distance
        $d_{u,k_i} = \min(d_{u,k_i}, d_{u,p} + d_{p,k_i})$
16:     CHECKSCORE($t_u$) if $t_u$ is updated
17:     update the counters for # of accessed nodes CHECKSCORE(tu)

1: for each updated entry of $t_u$ do
2:     if no out-portal allows shorter $d_{u,k_i}$ then
3:         mark this entry as determined
4: if score($t_u$) < $score_k$ then
5:     mark u not-top-k
6: else if $t_u$ is complete and determined then
7:     insert $t_u$ in top-k answers and update $score_k$
8: else
9: store $t_u$ {partial answer for future access}

---

In recapitulation, there has been addressed herein the efficient implementation of ranked keyword searches on graph-structured data. Since it is difficult to directly build indexes for general schemaless graphs, conventional techniques highly rely on graph traversal in running time. The previous lack of more knowledge about graphs also resulted in great difficulties in applying pruning techniques. To address these problems, there is introduced herein a new scoring function while the block is used as an intermediate access level; the result is an opportunity to create sophisticated indexes for keyword search.

Also proposed herein is a cost-balanced expansion algorithm to conduct a backward search, which provides a good theoretical guarantee in terms of the search cost. Experimentation indeed demonstrates the efficiency of inventive approaches as broadly contemplated herein. Results show that BLINKS improves the query performance by a great order of magnitude.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] G. Bhalotia, C. Nakhe, A. Hulgeri, S. Chakrabarti, and S. Sudarshan. Keyword searching and browsing in databases using BANKS. In *ICDE*, 2002.

[2] M. Garey, D. Johnson, and L. Stockmeyer. Some simplified NP-complete graph problems. *Theoretical Computer Science*, 1:237267, 1976.

[3] V. Kacholia, S. Pandit, S. Chakrabarti, S. Sudarshan, R. Desai, and H. Karambelkar. Bidirectional expansion for keyword search on graph databases. In *VLDB*, 2005.

[4] G. Karypis and V. Kumar. Analysis of multilevel graph partitioning. In *Supercomputing*, 1995.

[5] J. Liu. A graph partitioning algorithm by node separators. *ACM Trans. Math. Softw.*, 15(3):198219, 1989.

APPENDIX

Proof of Theorems

Proof of Theorem 1

Proof. Before we begin, we restate the original theorem in more formal terms. Given graph G and query $q=\{k_1, \ldots, k_m\}$, let $O_1, \ldots, O_m$ denote the corresponding cluster origins in G. Let d(.,.) denote the distance from the first argument to the second. Consider any backward search algorithm A. Consider the point at which A is able to correctly determine the node x that minimizes $\Sigma_i d(x, O_i)$, as well as the quantity itself For each $k_i$, let $n_i$ be a node not yet visited by A with minimum distance to $O_i$, and denote this distance by $d_i$. Let $C_i$ be the set of nodes whose distance to $O_i$ is less than $d_i$, and let $C'_i$ be the set of nodes whose distance to $O_i$ is exactly $d_i$. The following claims are true when A stops:
  (1) A has visited all nodes in $\cup_i C_i$.
  (2) $x \in \cap_i (C_i \cup C'_i)$
  (3) It is unnecessary for A to visit any node not in $\cup_i C_i$ (in other words, A is suboptimal if it has visited any node outside $\cup_i C_i$).

Claim (1) follows directly from the definition of $C_i$: Consider any $u \in C_i$. By definition, $d(u, O_i) < d_i$. If A has not visited u, this inequality will contradict with the definition of $d_i$.

To prove Claim (2), suppose on the contrary that for some i, $x \notin C_i$ and $x \notin C'_i$. It follows that $d(x, O_i) > d_i$. We claim that it is impossible for A to know the exact value of $d(x, O_i)$. Suppose A knows that $d(x, O_i) = d_i + \delta$, where $\delta > 0$. However, A has not yet visited $n_i$, and hence cannot rule out the existence of an edge $x \to n_i$ with an arbitrarily small weight $\epsilon < \delta$ (because a backward search can only see an edge when its destination has been visited). This edge would complete a path from x to some node in $O_i$ through $n_i$, and the distance along this path is $d_i + \epsilon < d_i + \delta$, a contradiction.

We now prove Claim (3). First, given that A has visited all nodes in each $C_i$, by Claim (1), it is easy to see that A can determine the membership of $C'_i$ without visiting any other node. Furthermore, for any node $y \in \cap_i (C_i \cup C'_i)$, A can compute $\Sigma_i d(y, O_i)$ without visiting any node outside $\cup_i C_i$. Therefore, the only remaining claim that we need verify is that A can establish the optimality of x without accessing any node outside $\cup_i C_i$. Suppose that node $z \notin C_i$. Accessing z does not help A in lower-bounding the distance from any node to $O_i$ at more than $d_i$. The reason is that without accessing $n_i$, A cannot rule out the existence of an edge $(n_i, z)$ with arbitrarily small weight. Therefore, accessing a node outside $\cup_i C_i$ cannot help A in lower-bounding $\Sigma_i d(v, O_i)$ for any v any more than what $u_i$'s can provide Proof of Theorem 2

Proof Let $E_i, \ldots, E_m$ denote P's clusters at the time when it finishes producing the query result, and let $E_x$ be the largest cluster among them. A should be able to generate its query result after it has accessed all nodes accessed by P. Since A uses cost-balanced expansion across clusters, A should reach that point when all its clusters have size $|E_x|$ (and therefore contains the corresponding $E_i$'s). The number of nodes accessed by A at that point is no more than $m \times |E_x| \leq m \times |\cup_i E_i|$, i.e., m times the number of nodes accessed by P.

What is claimed is:

1. An apparatus comprising:
  a processor; and
  a program storage device tangibly embodying a program of instructions that when executed by the processor enable the apparatus to perform:
  initiating a key word search on graph-structured data; and
  employing a Bi-Level Indexing for Keyword Search (BLINKS) strategy for searching the graph-structured data to produce at least one answer for the keyword search;
  wherein the program of instructions further enables the apparatus to perform employing a scoring function to assign a score to the at least one answer for the keyword search; and
  wherein the scoring function employs path anti-scoring, and wherein a path anti-score represents the shortest graph distance from a root node to another node.

2. The apparatus according to claim 1, wherein the BLINKS strategy comprises leveraging bi-level indices in a cost-balanced expansion.

3. The apparatus according to claim 2, wherein the program of instructions further enables the apparatus to perform:
  partitioning the graph-structured data into blocks; and
  storing summary information at a block level in a bi-level index enabling guided searching across blocks and accelerated forward searching from nodes within a block.

4. The apparatus according to claim 3, wherein the bi-level index comprises:
  a block index; and
  an intra-block index comprising a node-keyword index and a node-portal index.

5. The apparatus according to claim 4, wherein the node-keyword index comprises pre-computed node-keyword distance paths enabling speed up of query processing.

6. The apparatus according to claim 4, wherein the node-portal index comprises pre-computed node-portal information enabling completion of keyword searches having answers spanning multiple blocks via facilitating shortcut traversals.

7. The apparatus according to claim 2, wherein the BLINKS strategy further comprises a cost-balanced expansion search employing backward searching having a cost within a factor of m of a hypothetical optimal search, wherein m is a number of query keywords.

8. A method comprising:
  executing a program of instructions tangibly embodied on a program storage device with a processor of a machine to perform method steps, the method steps comprising:
  initiating a key word search on graph-structured data; and
  employing a Bi-Level Indexing for Keyword Search (BLINKS) strategy for searching the graph-structured data to produce at least one answer for the keyword search;
  wherein the method steps further comprise employing a scoring function to assign a score to the at least one answer for the keyword search; and
  wherein the scoring function employs path anti-scoring, and wherein a path anti-score represents the shortest graph distance from a root node to another node.

9. The method according to claim 8, wherein the BLINKS strategy comprises leveraging bi-level indices in a cost-balanced expansion.

10. The method according to claim 9, wherein the method steps further comprise partitioning the graph-structured data into blocks; and
  storing summary information at a block level in a bi-level index enabling guided searching across blocks and accelerated forward searching from nodes within a block.

11. The method according to claim 10, wherein the bi-level index comprises:
  a block index; and
  an intra-block index comprising a node-keyword index and a node-portal index.

12. The method according to claim 11, wherein the node-keyword index comprises pre-computed node-keyword distance paths enabling speed up of query processing.

13. The method according to claim 11, wherein the node-portal index comprises pre-computed portal node information enabling completion of keyword searches having answers spanning multiple blocks via facilitating shortcut traversals.

14. The method according to claim 9, wherein the BLINKS strategy further comprises a cost-balanced expansion search employing backward searching having a cost within a factor of m of a hypothetical optimal search, wherein m is a number of query keywords.

15. A program storage device readable by machine, tangibly embodying a program of instructions executable by the machine to perform a method comprising the steps of:
   initiating a key word search on graph-structured data; and
   employing a Bi-Level Indexing for Keyword Search (BLINKS) strategy for searching the graph-structured data to produce at least one answer for the keyword search;
   wherein the method steps further comprise employing a scoring function to assign a score to the at least one answer for the keyword search; and
   wherein the scoring function employs path anti-scoring, and wherein a path anti-score represents the shortest graph distance from a root node to another node.

16. The program storage device according to claim 15, wherein the program of instructions is further executable by the machine to perform:
   partitioning the graph-structured data into blocks; and
   storing summary information at a block level in a bi-level index enabling guided searching across blocks and accelerated forward searching from nodes within a block.

* * * * *